United States Patent
Sawai et al.

(10) Patent No.: US 6,252,590 B1
(45) Date of Patent: Jun. 26, 2001

(54) METHOD AND APPARATUS FOR IMAGE PROCESSING AND DISPLAY SYSTEM

(75) Inventors: Kunihito Sawai, Kanagawa; Yoshizumi Kuze, Chiba, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/950,566

(22) Filed: Oct. 15, 1997

(30) Foreign Application Priority Data

Oct. 16, 1996 (JP) .................................................. 8-293176

(51) Int. Cl.[7] ................................. H04N 5/46; G05F 3/00
(52) U.S. Cl. ......................... 345/334; 348/556; 386/95; 386/125; 345/339
(58) Field of Search ........................... 348/906, 913, 348/556, 557, 558, 554, 555, 564, 569, 570, 455, 445; 345/132, 133, 127, 327, 354, 334, 339; 386/125, 126, 45, 131, 95; H04N 5/46, 3/27

(56) References Cited

U.S. PATENT DOCUMENTS

| | | | |
|---|---|---|---|
| 5,065,346 | * 11/1991 | Kawai et al. | 395/128 |
| 5,111,284 | * 5/1992 | Tsujihara et al. | 358/60 |
| 5,329,369 | * 7/1994 | Willis et al. | 348/556 |
| 5,598,276 | * 1/1997 | Cookson et al. | 384/46 |
| 5,600,347 | * 2/1997 | Thompson et al. | 345/127 |
| 5,612,715 | * 3/1997 | Karaki et al. | 345/132 |
| 5,614,961 | * 3/1997 | Gibeau et al. | 348/750 |
| 5,657,034 | * 8/1997 | Yamazaki | 345/8 |
| 5,689,343 | * 11/1997 | Loce et al. | 358/298 |
| 5,748,175 | * 5/1998 | Shimada et al. | 345/127 |
| 5,767,833 | * 6/1998 | Vanderwiele et al. | 345/132 |
| 5,796,442 | * 8/1998 | Gove et al. | 348/556 |

* cited by examiner

*Primary Examiner*—Thomas Black
*Assistant Examiner*—Uyen Le
(74) *Attorney, Agent, or Firm*—Frommer Lawrence & Haug, LLP.; William S. Frommer; Gordon Kessler (57) ABSTRACT

An image-processing apparatus displays different UI pictures suitable for the resolutions in accordance with aspect ratios 16:9 and 4:3, respectively. UI picture data to form a UI picture is divided into wide-mode parts only used when the wide mode is set, normal-mode parts only used when the normal mode is set, and common parts shared between both modes. The divided parts are stored in a storage device. When the wide mode is set, the predetermined widemode parts and the common-parts are selected. When the normal mode is set, the predetermined normal-mode parts and the common parts are selected. The selected parts are mapped in predetermined positions of an effective display screen (image-processing region). Thus, the UI picture is formed. With this arrangement, the advantage of the increased resolution in accordance with an aspect ratio of 16:9 can be effectively utilized. Further, even though the resolution is changed to the wide mode, the displayed UI picture does not appear much different from that which would be displayed in the normal mode, thereby making the user comfortable with the resulting image.

7 Claims, 10 Drawing Sheets

|  | NORMAL MODE | | WIDE MODE | |
| --- | --- | --- | --- | --- |
|  | VGA | SVGA | WIDE-1 | WIDE-2 |
| HORIZONTAL RESOLUTION (NUMBER OF PIXELS) | 640 | 800 | 848 | 1060 |
| VERTICAL RESOLUTION (NUMBER OF PIXELS) | 480 | 600 | 480 | 600 |
| PIXEL FREQUENCY | 25.125 (MHz) | 49.500 (MHz) | 33.357 (MHz) | 65.588 (MHz) |
| HORIZONTAL SCANNING FREQUENCY | 31.4688 (KHz) | 46.875 (KHz) | 31.4688 (KHz) | 46.875 (KHz) |
| VERTICAL SCANNING FREQUENCY | 59.9405 (Hz) | 75.0000 (Hz) | 59.9405 (Hz) | 75.0000 (Hz) |

METHOD AND APPARATUS FOR IMAGE PROCESSING AND DISPLAY SYSTEM

BACKGROUND OF THE INVENTION

1. Field of the Invention

The present invention relates to an image-processing apparatus which is capable of performing required image processing in accordance with a changeable resolution mode. The invention also pertains to an image-processing method used in the above type of apparatus and to a display system formed by using the above type of apparatus.

2. Description of the Related Art

In television receivers, for example, in addition to the known display screens with an aspect ratio of 4:3, display screens with an aspect ratio of 16:9, which are generally referred to as "wide screens" are now widely used. Accordingly, the number of video-picture broadcast and software programs compatible with wide screens is increasing.

Moreover, along with the widespread use of personal computers, multimedia equipment operable based on a computer operating system (OS), which contains disk players compatible with various types of disk media and communication terminal capabilities, such as the Internet, are now available as one form of computer.

Therefore, monitors that are able to display images output from the above-described multimedia equipment are now being developed. Such monitors should at least be capable of receiving RGB signals output from computers and video signals, such as composite signals (and S video signals) associated with a normal television system and of displaying the resulting image.

The above type of monitor is thus able to display video images according to a standard television system, such as the NTSC method, and also to receive RGB signals output from the foregoing multimedia equipment, and to display the resulting image. It is therefore possible to construct a multimedia-capable monitor that is suitably used for both broadcast media or video image media, which output video image signals according to a standard television system, and for personal computers or multimedia equipment, which output RGB signals.

Additionally, in response to the above-described wide screens, multimedia-capable monitors having a display size in accordance with an aspect ratio of 16:9 are now being developed.

In currently available personal computers, the resolution, which is the graphic display standard represented by the number of horizontal pixels by the number of vertical pixels, being used corresponds to an aspect ratio of 4:3, and the resolution corresponding to an aspect ratio of 16:9 has not yet been determined. Thus, in the foregoing computers or multimedia equipment operable based on a computer OS, images are unfavorably output on display screens which are only effective for an aspect ratio of 4:3.

Further, when the above type of computer or multimedia equipment is combined with the foregoing multimedia-capable monitor provided with a display screen having an aspect ratio of 16:9, only the display area corresponding to an aspect ratio of 4:3 is used, and the whole display area with an aspect ratio of 16:9 cannot be effectively utilized.

In light of the foregoing background, it is expected in the computer field as well as in broadcast media that images will be displayed based on the resolution with an aspect ratio of 16:9.

However, the following problem is still present even if the resolution for graphic display can be switched between aspect ratios of 4:3 and 16:9. If a user-interface picture (hereinafter simply referred to as "the UI picture") that has been set for the resolution of the aspect ratio of 4:3 is displayed in accordance with the resolution with an aspect ratio of 16:9, the UI picture is unfavorably displayed in the effective display area with a smaller size than that which would be displayed with an aspect ratio of 4:3, thus making the user feel uncomfortable.

One of the countermeasures to the above drawback may be to execute image processing on the UI picture data in accordance with an aspect ratio of 16:9, for example, to widen the horizontal length of the UI picture. The resulting UI picture is however distorted by extending in the horizontal direction. The displayed UI picture thus appears different from the original image and appears rough in terms of resolution, thereby impairing the appearance from an aesthetic point of view.

SUMMARY OF THE INVENTION

Accordingly, it is an object of the present invention to display UI pictures suited for the resolutions in accordance with aspect ratios of 16:9 and 4:3, respectively, without burdening image processing.

In order to achieve the above object, according to one aspect of the present invention, there is provided an image-processing apparatus including resolution setting means for setting a resolution in accordance with an aspect ratio of 4:3 and a resolution in accordance with an aspect ratio of 16:9 as resolutions of an image to be displayed; image-data storage means for storing at least 4:3 image data for forming a first type of user interface image which is suitable for the 4:3 resolution and 16:9 image data for forming a second type of user interface image which is suitable for the 16:9 resolution; and image-processing means for executing image processing so that the first type of user interface image is formed based on the 4:3 image data read from the image-data storage means when the 4:3 resolution is set and that the second type of user interface image is formed based on the 16:9 image data read from the image-data storage means when the 16:9 resolution is set.

In the above-described image-processing apparatus, the 4:3 image data and the 16:9 image data may include a first type of image data which is used as parts for forming the first type of user interface image to be displayed when the 4:3 resolution is set, a second type of image data which is used as parts for forming the second type of user interface image to be displayed when the 16:9 resolution is set, and a third type of image data used as parts for forming a user interface image to be displayed when either of the 4:3 resolution or the 16:9 resolution is set. Then, the image-processing means may execute image processing so that the first type of user interface image is formed by reading predetermined items of the first image data and the third image data from the image-data storage means when the 4:3 resolution is set and by mapping the read data on an image-processing region determined based on the 4:3 aspect ratio. Further, the image-processing means may execute image processing so that the second type of user interface image is formed by reading predetermined items of the second image data and the third image data when the 16:9 resolution is set and by mapping the read data on an image-processing region determined based on the 16:9 aspect ratio.

According to another aspect of the present invention, there is provided an image-processing method. In this method, resolutions in accordance with aspect ratios of 4:3 and 16:9 are first set as resolutions of an image to be displayed. Then, at least 4:3 image data for forming a first type of user interface image which is suitable for the 4:3 resolution and 16:9 image data for forming a second type of user interface image which is suitable for the 16:9 resolution are stored in predetermined storage areas. Image processing is then executed so that the first type of user interface image is formed based on the 4:3 image data read from the image-data storage area when the 4:3 resolution is set and that the second type of user interface image is formed based on the 16:9 image data read from the image-data storage area when the 16:9 resolution is set.

According to a further aspect of the present invention, there is provided a display system including an image-processing apparatus having resolution setting means for setting a resolution in accordance with an aspect ratio of 4:3 and a resolution in accordance with an aspect ratio of 16:9 as resolutions of an image to be displayed, image-data storage means for storing at least 4:3 image data for forming a first type of user interface image which is suitable for the 4:3 resolution and 16:9 image data for forming a second type of user interface image which is suitable for the 16:9 resolution, and image-processing means for executing image processing so that the first type of user interface image is formed based on the 4:3 image data read from the image-data storage means when the 4:3 resolution is set and that the second type of user interface image is formed based on the 16:9 image data read from the image-data storage means when the 16:9 resolution is set. The display system also includes an image-signal output apparatus which outputs the image data obtained by the image-processing apparatus as an image signal, and a monitor having a display screen having a size in accordance with the aspect ratio of 4:3 or 16:9. The monitor is able to display, based on the image signal supplied from the image-signal output apparatus, images respectively suitable for the 4:3 resolution and the 16:9 resolution set by the image-processing apparatus.

With this configuration, the resolution is first set to be changeable between aspect ratios of 4:3 and 16:9. When the resolution in accordance with an aspect ratio of 4:3 is set, a corresponding user interface (UI) image is displayed. On the other hand, when the resolution in accordance with an aspect ratio of 16:9 is set, a corresponding UI image is displayed.

Image data to form the above UI images, for example, one type of UI image, is divided into a plurality of parts: first type of image data used when the resolution in accordance with an aspect ratio of 4:3 is set; second type of image data used when the resolution in accordance with an aspect ratio of 16:9 is set; and third type of image data used when either of the above resolutions is set. Thus, according to the present invention, instead of independently using totally different types of UI image data for the respective resolutions, common UI image data which is shared between the two resolutions (third type of image data) in addition to the specific different UI image data (first and second type of image data) is provided. As a consequence, different UI images can be suitably displayed in accordance with the resolution mode.

DESCRIPTION OF THE PREFERRED EMBODIMENTS

The preferred embodiments of the present invention will now be described with reference to FIGS. 1 through 12. The explanation will be given in the following order.

<1. Embodiment of the Display System>
<2. Example of the Configuration of the Set Top Box>
<3. Example of a Technique of Setting the Wide Mode in the Embodiment>
<4. UI Picture Display in the Embodiment>
<5. UI Picture Display Processing>

<1. Embodiment of the Display System>

Figure 1:
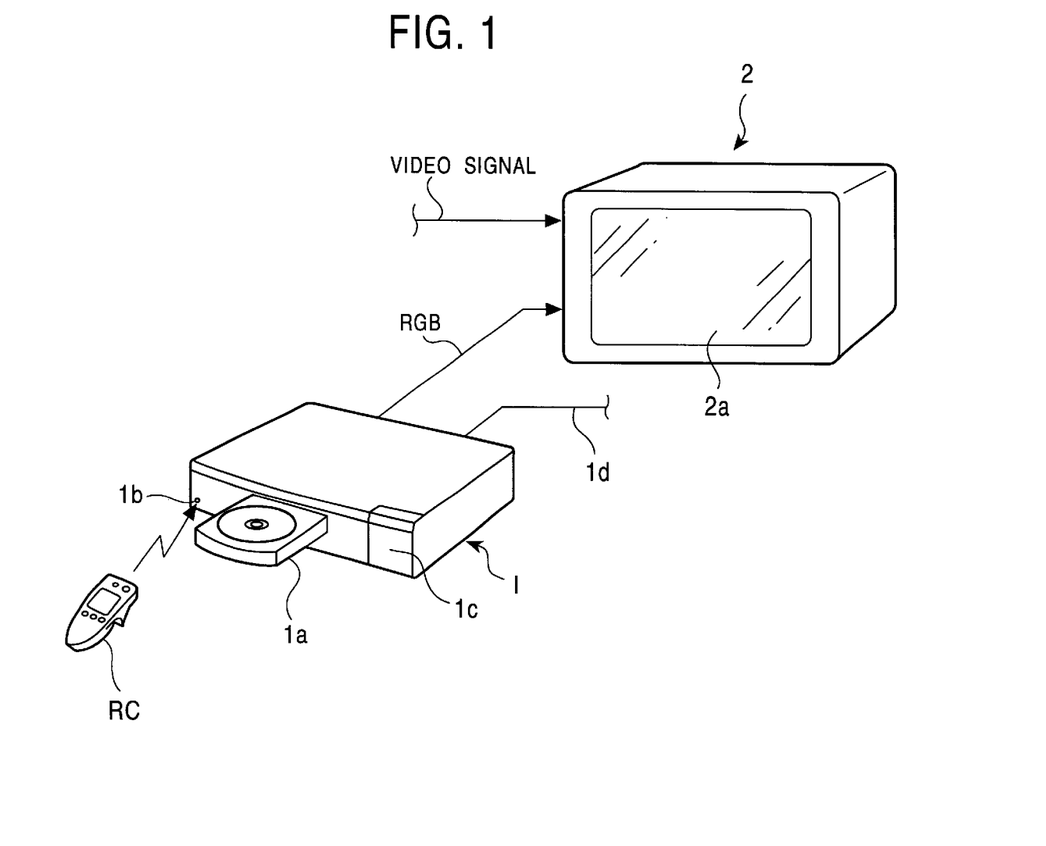
FIG. 1 is a perspective view illustrating the configuration of a display system according to an embodiment of the present invention.

FIG. 1 is a perspective view illustrating a display system according to an embodiment of the present invention. In FIG. 1, a set top box 1 is basically configured as, for example, a computer. More specifically, application and software programs for achieving various functions are operable on a pre-programmed and predetermined OS in this set top box 1. The set top box 1 also serves as a general-purpose disc player that is capable of reproducing not only various types of known disc media, such as CD-ROMs, Video CDs, Photo CDs, and compact disc digital audio (CD-DA), but also disc media which will be expected to be widely used, such as CD-plus. For reproducing the above disc media, a disc to be reproduced is loaded in a disc tray 1a provided in the set top box 1, and the disc tray 1a is then inserted into the box 1.

The set top box 1 has a communication capability, such as performing computer communications through the use of, for example, the Internet, by being connected to a telephone circuit via a telephone line 1d.

In this manner, the set top box 1 of this embodiment is formed as multimedia equipment at least suitably used for various disc media and communication capabilities.

The set top box 1 constructed as described above is connected to, for example, a monitor 2 or an audio system (not shown) so that the user is able to observe images or listen to sound output from the set top box 1. A graphical user interface (GUI) is employed in the set top box 1, and graphics and icons (i.e., UI pictures) are output to the monitor 2 when the foregoing disc media are reproduced or the Internet is utilized. The user is able to operate the set top box 1 through the operation panel or the remote controller RC provided for the box 1 while observing the display screen of the monitor 2. The operation panel of the set top box 1 appears on the front panel of the box 1 by opening an operation panel cover 1c. The remote controller RC outputs infrared transmitting signals in this embodiment.

The monitor 2 shown in FIG. 1 is a multimedia-capable type, which is able to display, for example, both video images of typical audio-visual equipment and video images of personal computers. Namely, the monitor 2 is able to receive at least video signals (for example, composite signals or S video signals) output from audio-visual equipment operable according to a predetermined television system and RGB signals output from computers. In this case, the set top box 1 is connected to the monitor 2 so that the video images from the box 1 can be supplied to the monitor 2 as RGB signals. If it is desired that high-definition signals are input and displayed on the monitor 2, a high-definition video image input terminal in accordance with $(Y, P_B, P_R)$ signals should be provided. The monitor 2 has a display screen 2a of a size corresponding to the aspect ratio of 16:9. The monitor 2 also has a multi-scan function, which is able to switch the operations of, for example, a deflecting system, in accordance with the resolution set by the graphic display standard of personal computers.

<2. Example of the Configuration of the Set Top Box>

Figure 2:
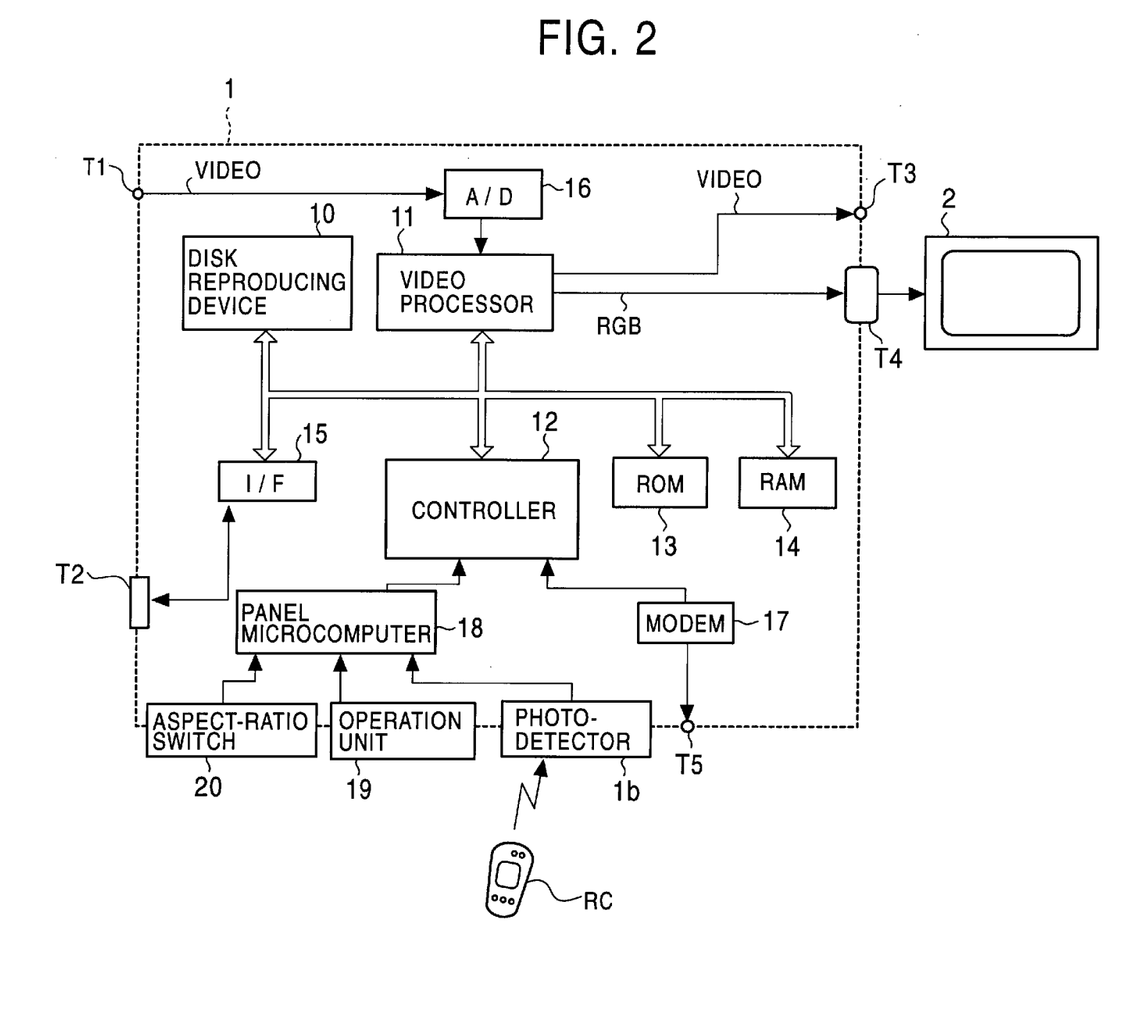
FIG. 2 is a block diagram illustrating the internal configuration of a set top box.

FIG. 2 is a block diagram illustrating the internal configuration of the essential portion of the set top box 1. The set top box 1 shown in FIG. 2 is provided with a disc reproducing device 10 for reproducing a variety of disc media as noted above. The data reproduced by the disc reproducing device 10 is supplied to the required function circuit via a bus line.

A video processor 11 has, for example, a VRAM, and executes required signal processing on the supplied video image data and outputs it as an RGB signal (non-interlaced) or a video signal (a composite signal or an S video image signal according to a standard television system). The RGB signal output from the video processor 11 is fed to the monitor 2 via an RGB output terminal T4, while the video signal is supplied to a video image output terminal T3.

The processing operation performed by the video processor 11 is controlled by a controller 12, and the mode of the operation varies depending on the application or software program to run on the computer. For example, image data reproduced from a disc by the disc reproducing device 10 is first transmitted to the video processor 11 via the bus line. The video processor 11 then executes the signal processing necessary for the input image data and outputs the processed data as an RGB signal or a video signal.

The video processor 11 also performs video signal processing on UI pictures under the control of the controller 12 in the following manner. In response to an input operation command, the corresponding UI picture data is read from the data stored in a ROM 13 and is supplied to the video processor 11. The video processor 11 then executes image processing so that the UI picture can be displayed in a predetermined position of the image display area. The UI picture may be displayed singly or together with a certain media image on the display area.

Moreover, the set top box 1 is provided with a video image input terminal T1 through which analog video signals can be input from an external source. The analog video signal is converted into a digital signal by an analog-to-digital (A/D) converter 16 and is supplied to the video processor 11. Accordingly, the video processor 11 is capable of executing image processing on video signals input from an external source and outputting the resulting signal.

The controller 12 performs the required control operations corresponding to the respective function circuits. The controller 12 is a multimedia-capable type, which is configured to suitably perform video signal processing, sound signal processing, and control processing related to the communication capability. In this embodiment, the controller 12 is able to switch the resolution between the aspect ratios of 4:3 and 16:9, which will be explained later, by controlling the video processor 11.

Stored in the ROM 13 are the OS run on the set top box 1, application and software programs, and UI picture data. A RAM (memory) 14 stores data concerning an application or software program to run and processing data. Application or software programs may be read from media, such as CD-ROMs rather than from the ROM 13, in which case, application data read from, for example, a CD-ROM by the disc reproducing device 10 is stored in the RAM 14.

The set top box 1 of this embodiment has a communication capability, as noted above, and contains a modem 17 via the controller 12 and a telephone modular jack T5, as illustrated in FIG. 2. Accordingly, the controller 12 is also configured to respond to the above communication capability, and a software program for implementing the communication capability is stored in, for example, the ROM 13.

Inputs to a panel microcomputer 18 are operation information signals received by a photodetector 1b, and operation information signals received by an operation unit 19 provided on the front panel of the set top box 1. The state of an aspect-ratio switch 20 is also input into the panel microcomputer 18 as operation information. The panel microcomputer 18 analyzes an input operation signal to generate a command signal and transmits it to the controller 12. The controller 12 then executes control processing required for the input command signal.

Figure 3:
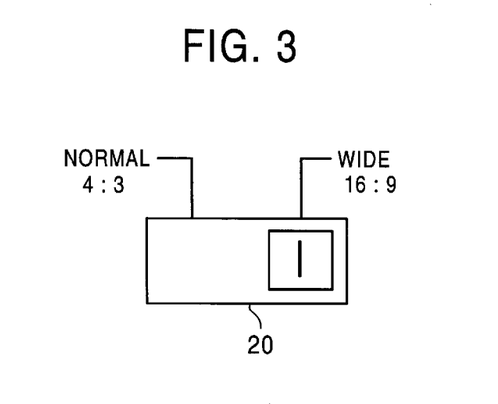
FIG. 3 is a plan view illustrating an aspect-ratio switch.

The above-described aspect-ratio switch 20 is provided at the rear panel of the set top box 1 as a slide switch, such as the one shown in FIG. 3. When the "monitor ratio" is switched to "the normal 4:3 " mode, an RGB signal is output with a resolution of the aspect ratio of 4:3 (normal mode), which will be explained later. On the other hand, when the "monitor ratio" is switched to the "wide 16:9" mode, an RGB signal is output with a resolution of the aspect ratio of 16:9.

Further, a data input/output terminal T2 is further provided for the set top box 1 and is connected to the bus line via an interface 15. Through this input/output terminal T2, it is possible to perform data transmission between the set top box 1 and other types of media reproducing devices, printers, digital audio-visual equipment, and data storage devices, for example, hard disk drives.

<3. Example of a Technique of Setting the Wide Mode in the Embodiment>

A description will now be given of an example of a technique of setting the wide mode in this embodiment with reference to FIGS. 4 through 6.

By the use of the aspect-ratio switch 20, the foregoing set top box 1 of this embodiment is capable of switching between the normal mode and the wide mode. As discussed above, in the normal mode ROB signals are output with a resolution of the aspect ratio of 4:3, while in the wide mode RGB signals are output with a resolution of the aspect ratio of 16:9.

The graphic display standards of the set top box 1 used in this embodiment are determined in the following manner.

Known video graphic array (VGA) and super-VGA (SVGA) are employed for the normal mode (aspect ratio of 4:3), while the SVGA, which has a higher resolution than the VGA, is used for the wide mode (aspect ratio of 16:9). A technique of setting the wide mode in this embodiment will now be explained in detail below.

Figure 4:
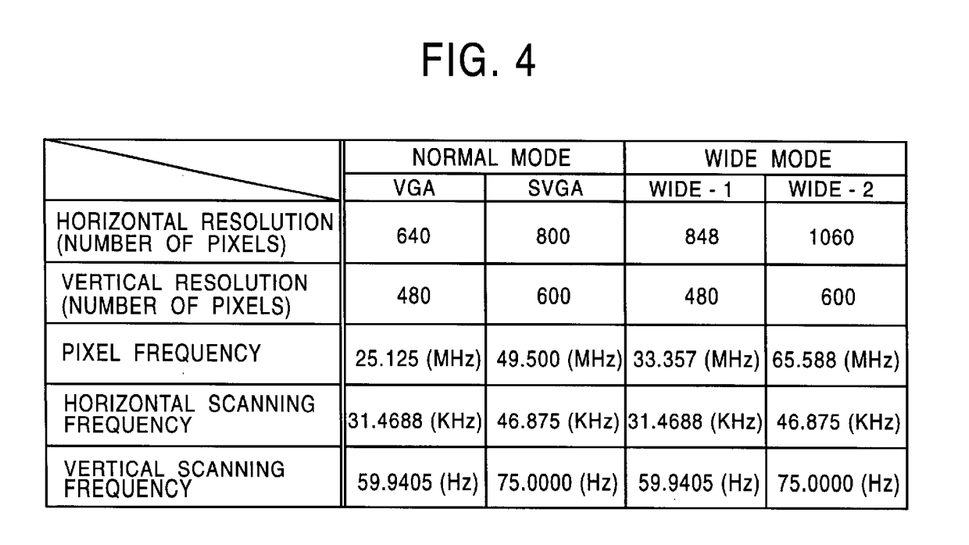
FIG. 4 illustrates the specifications of VGA, SVGA, and two wide modes used in an embodiment of the present invention.

FIG. 4 illustrates the specifications of the normal mode and the wide mode used in this embodiment. As noted above, the 640×480-pixel VGA, expressed by the number of horizontal pixels by the number of vertical pixels, and the 800×600-pixel SVGA are employed for the normal mode. VGA has a pixel frequency of 25.125 MHz, a horizontal scanning frequency of 31.4688 KHZ, and a vertical scanning frequency of 59.9405 Hz. SVGA has a pixel frequency of 49.500 MHz, a horizontal scanning frequency of 46.875 KHz, and a vertical scanning frequency of 75.0000 Hz.

In contrast, the wide mode used in this embodiment is divided into two modes with different resolutions. One wide mode is referred to as "WIDE-1", while the other wide mode is referred to as "WIDE-2", which has a higher resolution than "WIDE-1". The WIDE-1 mode has a 848×480 resolution, a pixel frequency of 33.357 MHz, a horizontal scanning frequency of 31.4688 KHz, and a vertical scanning frequency of 59.9405 Hz. On the other hand, the WIDE-2 mode has a 1060×600 resolution, a pixel frequency of 65.588 MHz, a horizontal scanning frequency of 46.875 KHz, and a vertical scanning frequency of 75.0000 Hz.

According to the above specifications of the wide mode, the vertical resolution (the number of vertical pixels) of the WIDE-1 mode is the same as the VGA, while the vertical resolution of the WIDE-2 mode is the same as the SVGA. Namely, the WIDE-1 mode (848×480 pixels) originally had a resolution similar to the VGA (640×480 pixels), and then, the number of horizontal pixels of the WIDE-1 mode is extended in accordance with the aspect ratio of 16:9. Likewise, the WIDE-2 mode (1060×600 pixels) originally had a resolution similar to the SVGA (800×600 pixels), and then, the number of horizontal pixels of the WIDE-2 mode is extended in accordance with the aspect ratio of 16:9.

The horizontal scanning frequency and the vertical scanning frequency of the WIDE-1 mode are similar to those of the VGA, but the pixel frequency of the WIDE-1 mode differs from that of the VGA in correspondence with the increased number of horizontal pixels. Likewise, the horizontal scanning frequency and the vertical scanning frequency of the WIDE-2 mode are similar to those of the SVGA, but the pixel frequency of the WIDE-2 mode is different from that of the SVGA in accordance with the increased number of horizontal pixels.

Namely, when scanning is conducted in the monitor 2 to display an image in the wide mode, the same horizontal/vertical scanning frequencies as the normal mode (VGA or SVGA) may be employed.

A technique of setting the number of pixels (resolution) in the above-described WIDE-1 and WIDE-2 modes will now be described with reference to FIGS. 5 and 6.

In addition to the SVGA (800×600) shown in FIG. 4, higher-resolution SVGAs (1024×768) and (1280×1024) are also specified as SVGA resolutions. In this embodiment, the higher-resolution SVGAs (1024×768) and (1280×1024) are employed to set the number of pixels of the WIDE-1 and WIDE-2 modes, respectively. It should be noted that the number of horizontal/vertical pixels corresponds to the aspect ratio of 4:3 in the above higher-resolution SVGAs.

Figure 5:
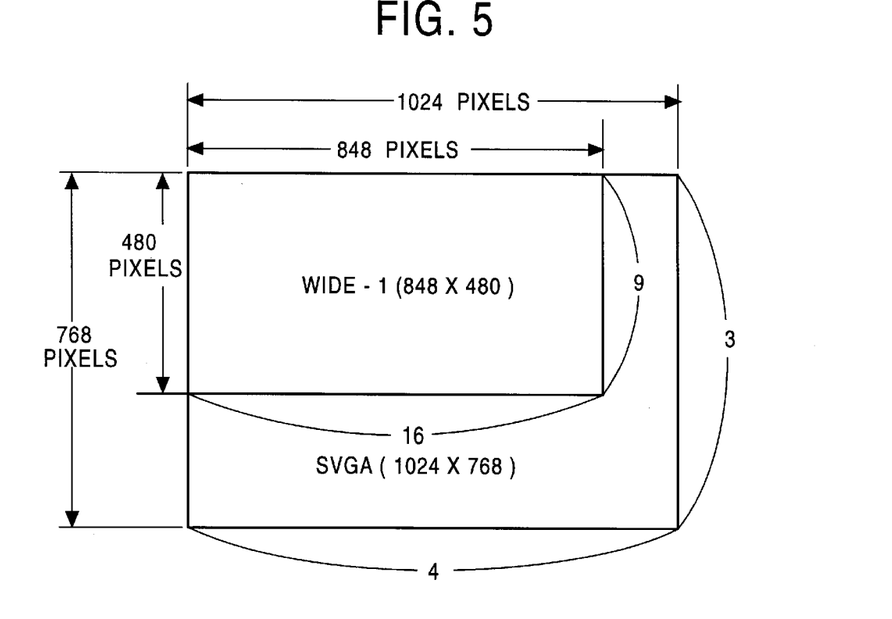
FIG. 5 illustrates a concept of the image processing executed for setting the resolution used in a wide mode.

FIG. 5 illustrates an example of the number of pixels (resolution) of the "WIDE-1" mode according to the SVGA (1024×768). In this example, on a pixel data map consisting of 1024×768 pixels (SVGA), only 848 pixels are used in the horizontal direction, while only 480 pixels are used in the vertical direction. Thus, the resolution of the WIDE-1 mode (848×480) can be set.

Figure 6:
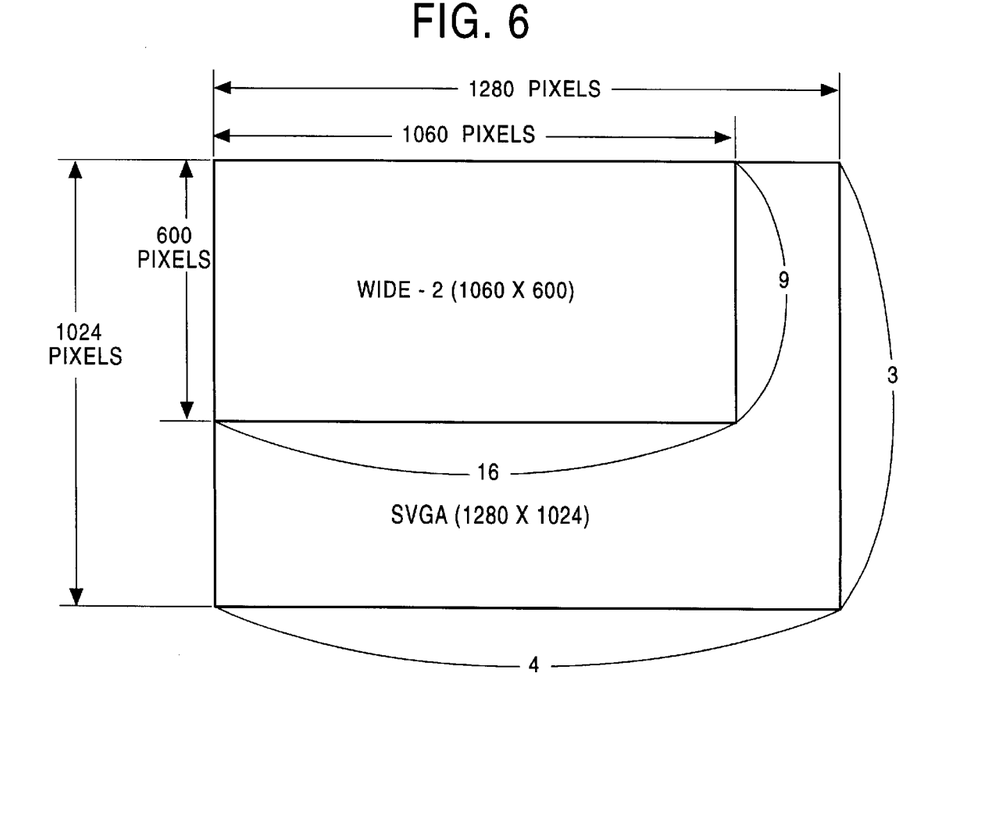
FIG. 6 illustrates a concept of the image processing executed for setting the resolution used in another wide mode.

FIG. 6 illustrates an example of the numbers of pixel (resolution) of the WIDE-2 mode according to the SVGA (1280×1024). In this example, on a pixel data map consisting of 1280×1024 pixels (SVGA), only 1060 pixels are used in the horizontal direction, while only 600 pixels are used in the vertical direction. As a consequence, the resolution of the WIDE-2 mode (1060×600) can be set.

In order to actually create image data in accordance with the WIDE-1 mode (WIDE-1 area), the following image processing is executed. An image processing region corresponding to the SVGA (1024×768) is first generated in the VRAM of the video processor 11, and data is written into or read from only part of the image processing region in accordance with the WIDE-1 (848×480) area shown in FIG. 5. As a result, image data corresponding to the WIDE-1 (848×480) area can be obtained.

Likewise, in order to produce image data corresponding to the WIDE-2 area, an image processing region associated with the SVGA (1280×1024) is first generated in the VRAM, and image processing is performed only by using the WIDE-2 (1060×600) area illustrated in FIG. 5.

The video processor 11 then performs the required signal processing on the image data according to the WIDE-1 (848×480) mode or the WIDE-2 (1060×600) mode, and outputs the processed data as an RGB signal, together with the horizontal/vertical scanning frequency signals, such as those indicated by FIG. 4. As a consequence, the monitor 2 is able to display the resulting image with an aspect ratio of 16:9.

According to the foregoing method for changing the aspect ratio (the resolution), both WIDE-1 (848×480) and WIDE-2 (1060×600) modes are set based on the SVGA. To achieve this method, it is essential only that a software program be constructed to implement the video image processing shown in FIGS. 5 and 6 in a known VGA and SVGA display control system. Namely, in this embodiment a known VGA and SVGA display control system as hardware may be used to implement the above image processing.

<4. UI Picture Display in the Embodiment>

The UI picture display in this embodiment will now be described with reference to FIGS. 7 through 11. For the sake of simplicity, the resolution that can be set by switching between the normal mode and the wide mode is restricted to the VGA (640×480) and the WIDE-1 (848×480) mode, and the SVGA (800×600) and the WIDE-2 (1060×600) mode will not be considered.

Figure 7:
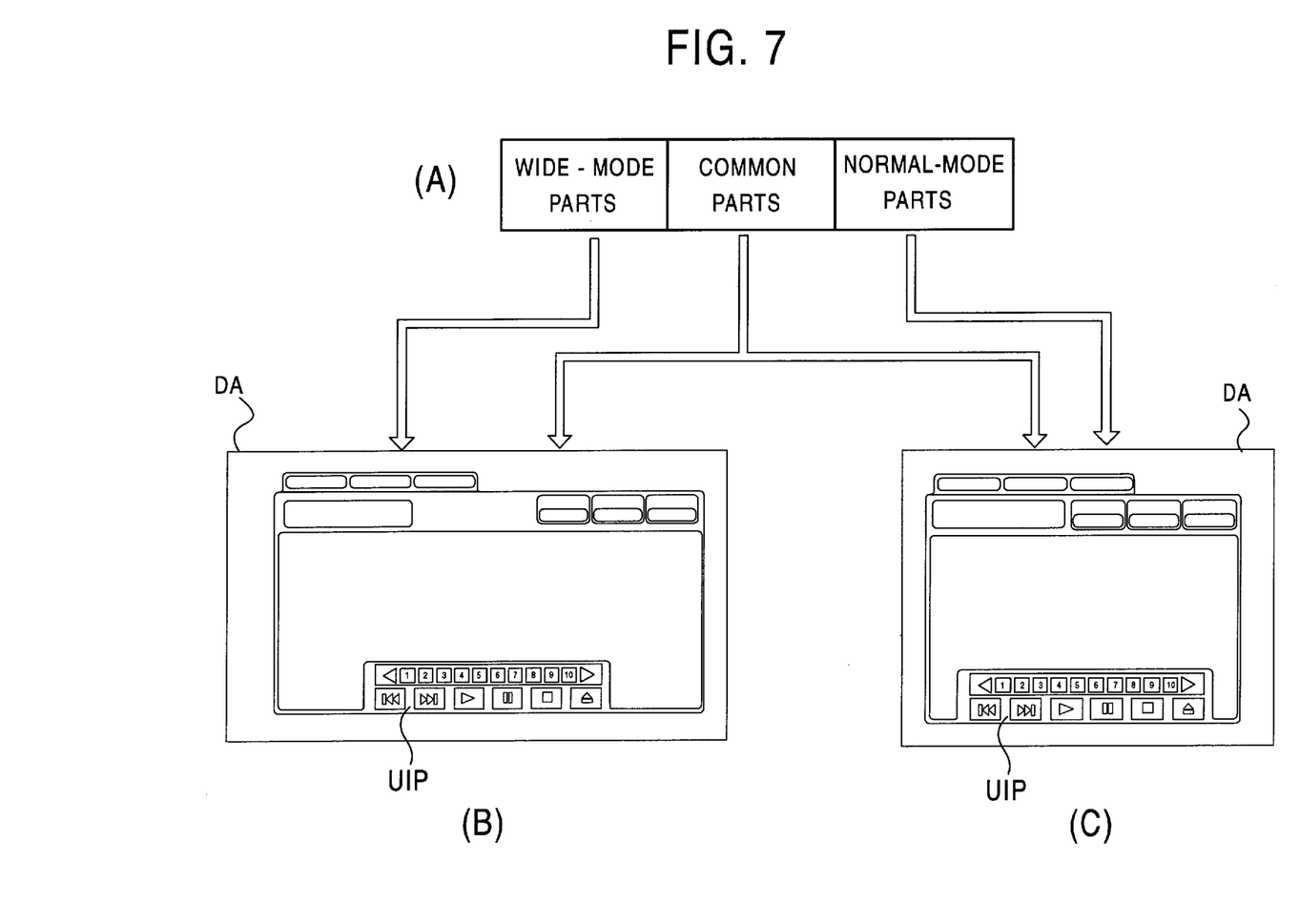
FIG. 7 illustrates a concept of the image processing executed for forming UI picture data according to an embodiment of the present invention.

FIG. 7 illustrates a concept of the UI picture display according to this embodiment. The contents of the UI picture data stored in the ROM 13, i.e., "wide-mode parts", "common parts", and "normal-mode parts" are indicated by (A) in FIG. 7. It will now be assumed in this embodiment that one UI picture to be displayed on the display screen is basically formed of a group consisting of a plurality of image portions obtained by dividing the UI picture. The image portions will be referred to as "the parts".

The above-described "wide-mode parts" are used to display the UI picture in the wide mode. The "normal-mode parts" are employed to display the UI picture in the normal mode. The "common parts" are used to display the UI picture both in the wide mode and in the normal mode. Accordingly, the ROM 13 of the set top box 1 used in this embodiment is provided with the individual regions for storing the "wide-mode parts", "common parts", and "normal-mode parts".

A UI picture UIP displayed in relation to the effective display area DA having an aspect ratio of 16:9 in the wide mode is shown in (B) of FIG. 7. The effective display area indicates the area which is displayable by the determined resolution. To produce the UI picture UIP to be displayed in the wide mode shown in (B) of FIG. 7, the "wide-mode parts" and "common parts" are suitably selected from the ROM 13 and are arranged in accordance with a predetermined positional relationship.

Similarly, a UI picture UIP in relation to the effective display area DA having an aspect ratio of 4:3 is shown in (C) of FIG. 7. In a manner similar to the formation of the UI picture in the wide mode, the "normal-mode parts" and "common parts" are appropriately selected from the ROM 13 and are arranged in accordance with a predetermined positional relationship.

The foregoing image processing is carried out under the control of the controller 12. In the wide mode, for example, the controller 12 reads suitable "wide-mode parts" and "common parts" from the ROM 13 corresponding to the image data to be displayed and transfers them to the video processor 11.

Also stored in the ROM 13 is data indicating which parts should be mapped in which bit positions of an image processing region in accordance with the type of UI picture to be displayed. This data is read from the ROM 13 to the controller 12 simultaneously upon reading the parts data.

In the VRAM of the video processor 11, the image processing region which has been set as the wide mode corresponding to the number of horizontal/vertical pixels of the WIDE-1 (848×480) area is formed. Meanwhile, in the controller 12 the "wide-mode parts" data and "common parts" data transferred from the ROM 13 are mapped in the predetermined bit positions of the image processing region. As a consequence, the image data, such as the one shown in (B) of FIG. 7 is formed.

The foregoing procedure for the formation of the UI picture also applies to the normal mode. In this case, the "normal-mode parts" data and "common parts" data are suitably read from the ROM 13 and are transferred to the video processor 11. The "normal-mode parts" data and "common parts" data are mapped in the predetermined positions of the image processing region corresponding to the number of horizontal/vertical pixels of VGA (640×480), thereby creating the image data, such as the one illustrated in (C) of FIG. 7.

In this embodiment, UI picture data ("wide-mode parts" data, "common parts" data, and "normal-mode parts" data) is expressed in the form of bit map data.

Figure 8:
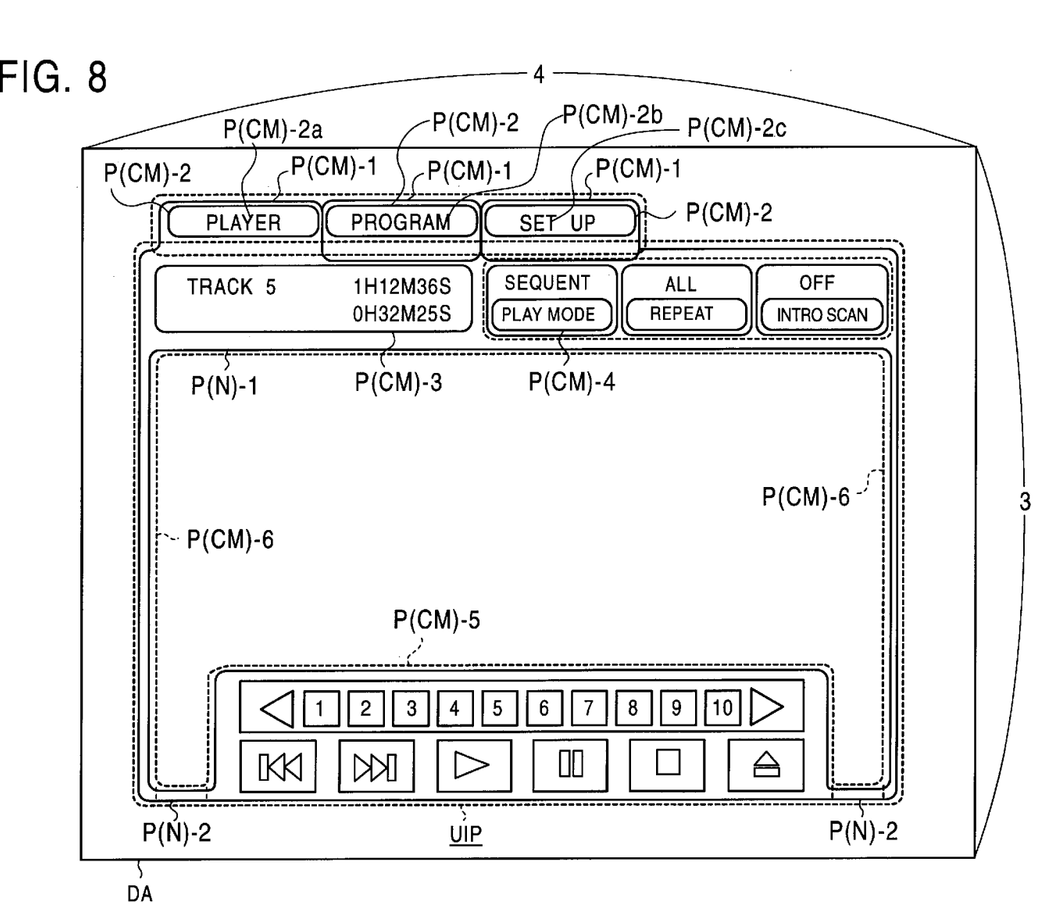
FIG. 8 illustrates an example of the UI picture display in the normal mode.
Figure 9:
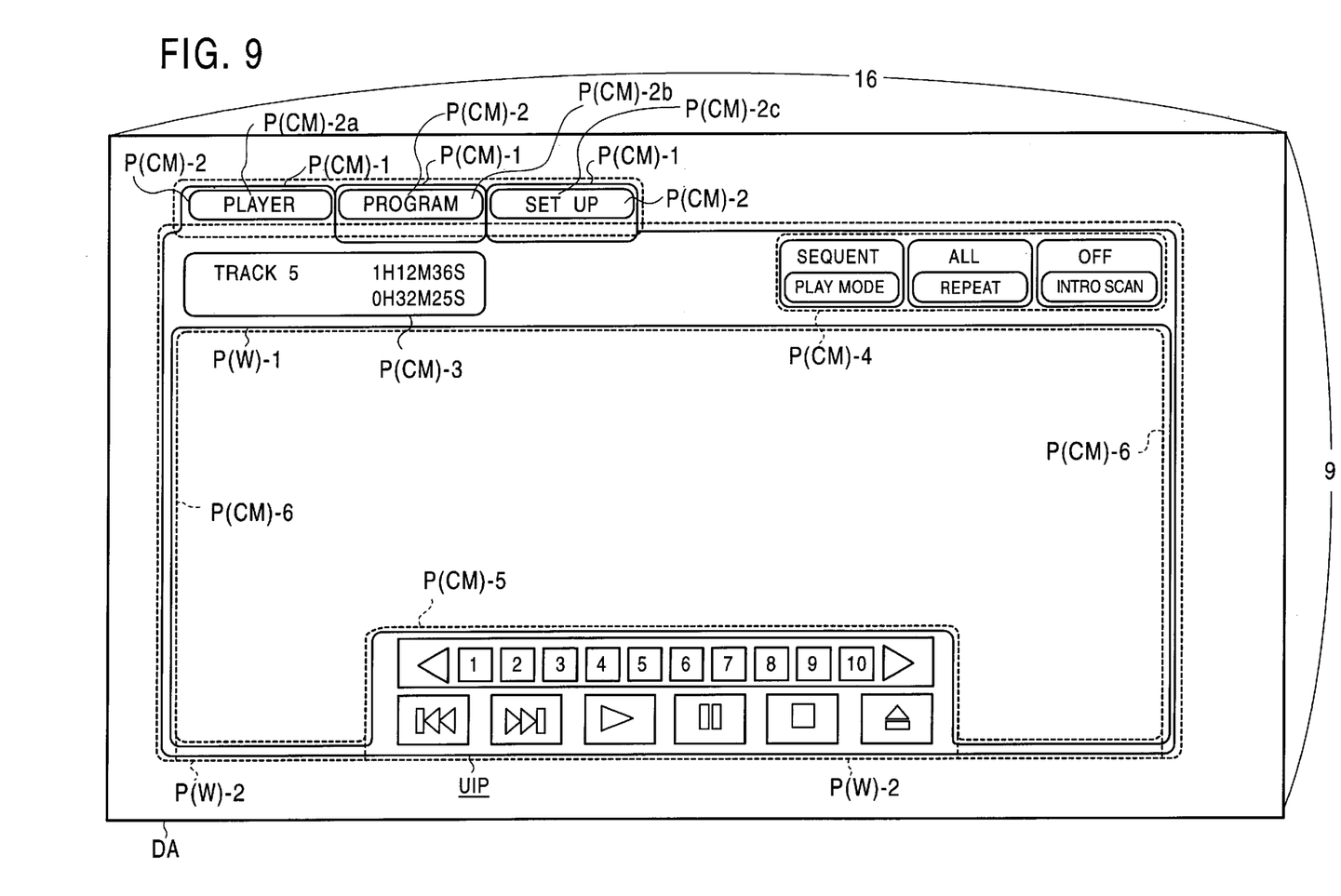
FIG. 9 illustrates an example of the UI picture display in the wide mode.

FIGS. 8 and 9 illustrate the same type of UI picture displayed in the normal mode and in the wide mode, respectively. The UI screen shown in FIGS. 8 and 9 serves as an operation panel through which the user is able to specify the reproducing operation of the disc reproducing device 10, though a detailed explanation will not be given.

In FIG. 8, the effective display area DA, which has an aspect ratio of 4:3, is based on the VGA resolution (640× 480) in the normal mode. The UI picture UIP is displayed with the effective display area DA, as illustrated in FIG. 8.

The UI picture UIP is formed by positioning a plurality of required parts, as noted above. In FIG. 8, the parts are followed by marks, such as those indicated by "P(*)-n": P(CM)-n designates "common parts", while P(N)-n represents "normal-mode parts". In FIG. 9, which will be referred to later, P(W)-n indicates "wide-mode parts". The broken lines shown in FIGS. 8 and 9 indicate separations (boundaries) between the respective parts forming the UI pictures.

In the UI picture indicated in the normal mode shown in FIG. 8, three tab parts P(CM)-1, P(CM)-1, P(CM)-1 are first arranged (mapped). Button parts P(CM)-2, P(CM)-2, P(CM)-2 Ad indicating the tab names are then mapped on the tab parts P(CM)-1, P(CM)-1, P(CM)-1, respectively. Further, name parts P(CM)-2a, P(CM)-2b, P(CM)-2c represented by, for example, "PLAYER", "PROGRAM", "SET UP", are mapped on the button parts P(CM)-2, P(CM)-2, P(CM)-2, respectively.

A sheet part P(N)-1 is mapped immediately below the tab parts P(CM)-1, P(CM)-1, P(CM)-1. On this sheet part P(N)-1, a window part P(CM)-3 indicating the reproducing state of a track and a panel part P(CM)-4 through which the user is able to set various reproducing functions are arranged, as shown in FIG. 8. Moreover, frame parts P(CM)-6, P(CM)-6 to form the left and right frames are mapped at both edges below the sheet part P(N)-1, and two frame parts P(N)-2, P(N)-2 to form lower frames are mapped below the frame parts P(CM)-6, P(CM)-6. Then, a panel part P(CM)-5 representing reproducing-operation keys is mapped between the two frame parts P(N)-2, P(N)-2. The foregoing parts are mapped as described above to produce the UI picture shown in FIG. 8.

A wide-mode UI picture, which is the same type of the UI picture illustrated in FIG. 8, is displayed, as shown in FIG. 9, with the effective display area DA in the wide mode having an aspect ratio of 16:9. The size of the effective display area DA is determined based on the WIDE-1 resolution (848×480). The same elements as those shown in FIG. 8, i.e., "common parts" represented by "P(CM)-n" among the parts forming the UI picture UIP in the normal mode, are designated by like reference numerals, and an explanation thereof will thus be omitted.

In the UI picture UIP to be displayed in the wide mode, in place of the sheet part P(N)-1 illustrated in FIG. 8, a sheet part P(W)-1 is mapped in accordance with the display size having an aspect ratio of 16:9. On this sheet part P(W)-1, a window part P(CM)-3 and a panel part P(CM)-4 through which the user is able to set various reproduction functions are mapped in the predetermined positions, as shown in FIG. 9. Moreover, as the two frame parts which form the lower frames of the UI picture UIP, instead of the frame parts P(N)-2, P(N)-2 illustrated in FIG. 8, frame parts P(W)-2, P(W)-2 are mapped in accordance with the display size having an aspect ratio of 16:9.

Upon comparison between the UI pictures UIP respectively illustrated in FIGS. 8 and 9, it has been seen that the regions of the effective display area DA where information-indicating windows and the user-operation panels are to be displayed are formed by common parts, for example, tab parts P(CM)-1, button parts P(CM)-2, name parts P(CM)-2a through P(CM)-2c, a window part P(CM)-3, a panel part P(CM)4, and a panel part P(CM)-5. It is also seen that the normal-mode parts, i.e., the sheet part P(N)-1 and frame parts P(N)-2, P(N)-2, and the wide-mode parts, i.e., the sheet part P(W)-1 and frame parts P(W)-2, P(W)-2, are respectively used to change the size of the UI picture due to a difference between the aspect ratios of 4:3 and 16:9.

With this arrangement, the size of the essential portions of the UI picture related to the user operation and information indication, i.e., the windows and the panels, is unchanged between the normal mode and the wide mode. Accordingly, no substantial change is made to the overall UI picture, thus making the user feel visually comfortable with the resulting image.

In contrast, if image processing is executed in the wide mode so that UI picture data created in accordance with the normal mode is extended in the horizontal direction, the above-described windows and panels are distorted by extending in the horizontal direction. This makes the resulting image appear much different from that which would otherwise be in the normal mode, thus making the user feel uncomfortable. Additionally, although the horizontal resolution (number of horizontal pixels) has been increased in the wide mode, UI picture data having a resolution determined in accordance with the normal mode is extended in the horizontal direction, thereby relatively degrading the overall resolution of the displayed UI picture.

According to the foregoing UI-picture formation method from an aspect of image processing, a comparatively large number of common parts that can be shared between the normal mode and the wide mode may be used depending on the type of UI picture, thereby decreasing the amount of UI picture data as to be stored in the ROM 13. Accordingly, the storage capacity of the ROM 13 can be effectively utilized. Further, only a small number of types of UI picture data to be stored in the ROM 13 is required, thus hardly burdening the controller 12 to display UI pictures.

Moreover, since UI picture data is managed by unit parts in this embodiment, even if part of a UI picture is required to be changed, it is essential only that the corresponding portion of the UI picture that is needed to be modified be changed rather than the whole picture. Thus, the level of flexibility in changing the specifications of UI pictures is high.

Figure 10:
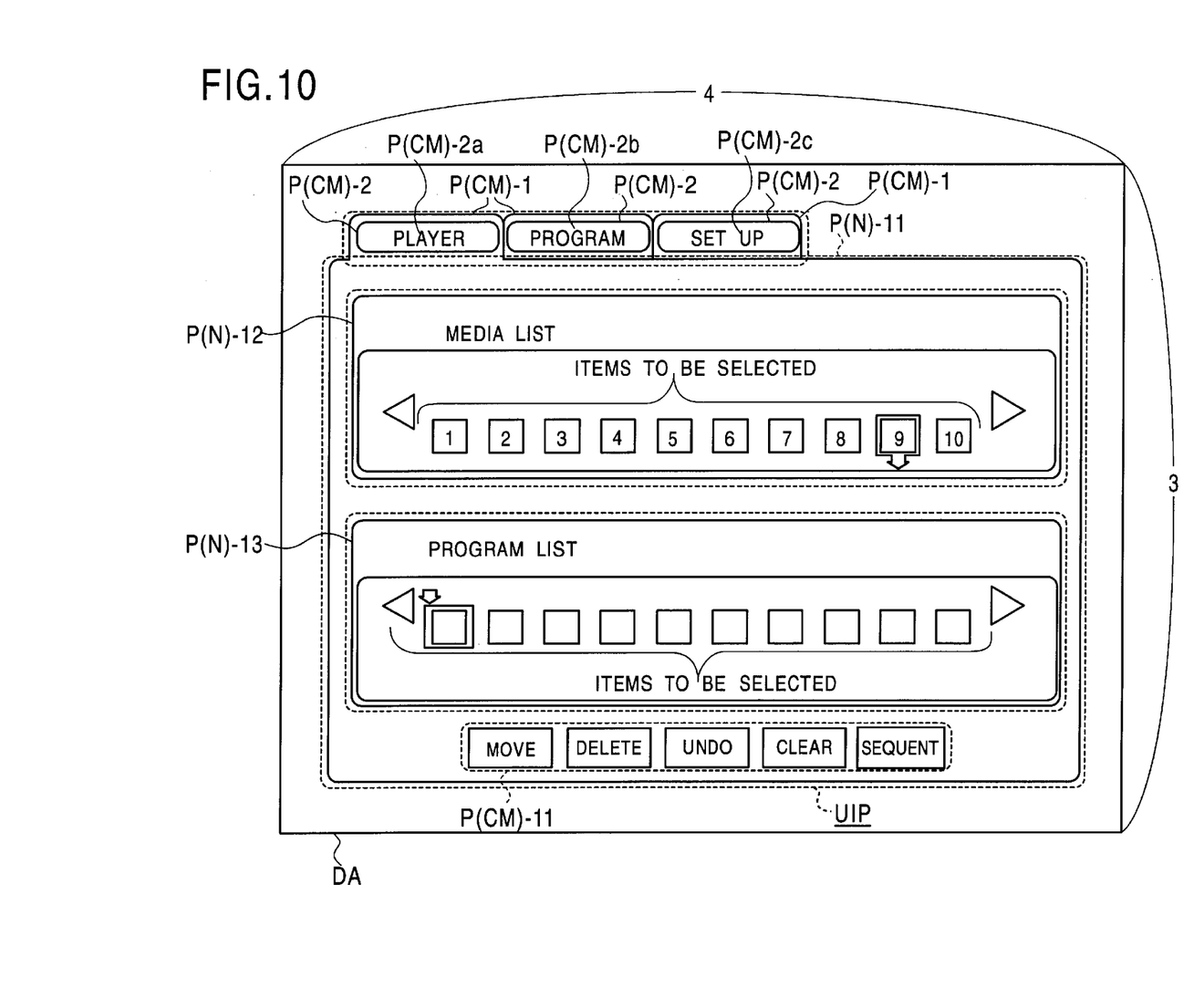
FIG. 10 illustrates an example of the UI picture display in the normal mode.
Figure 11:
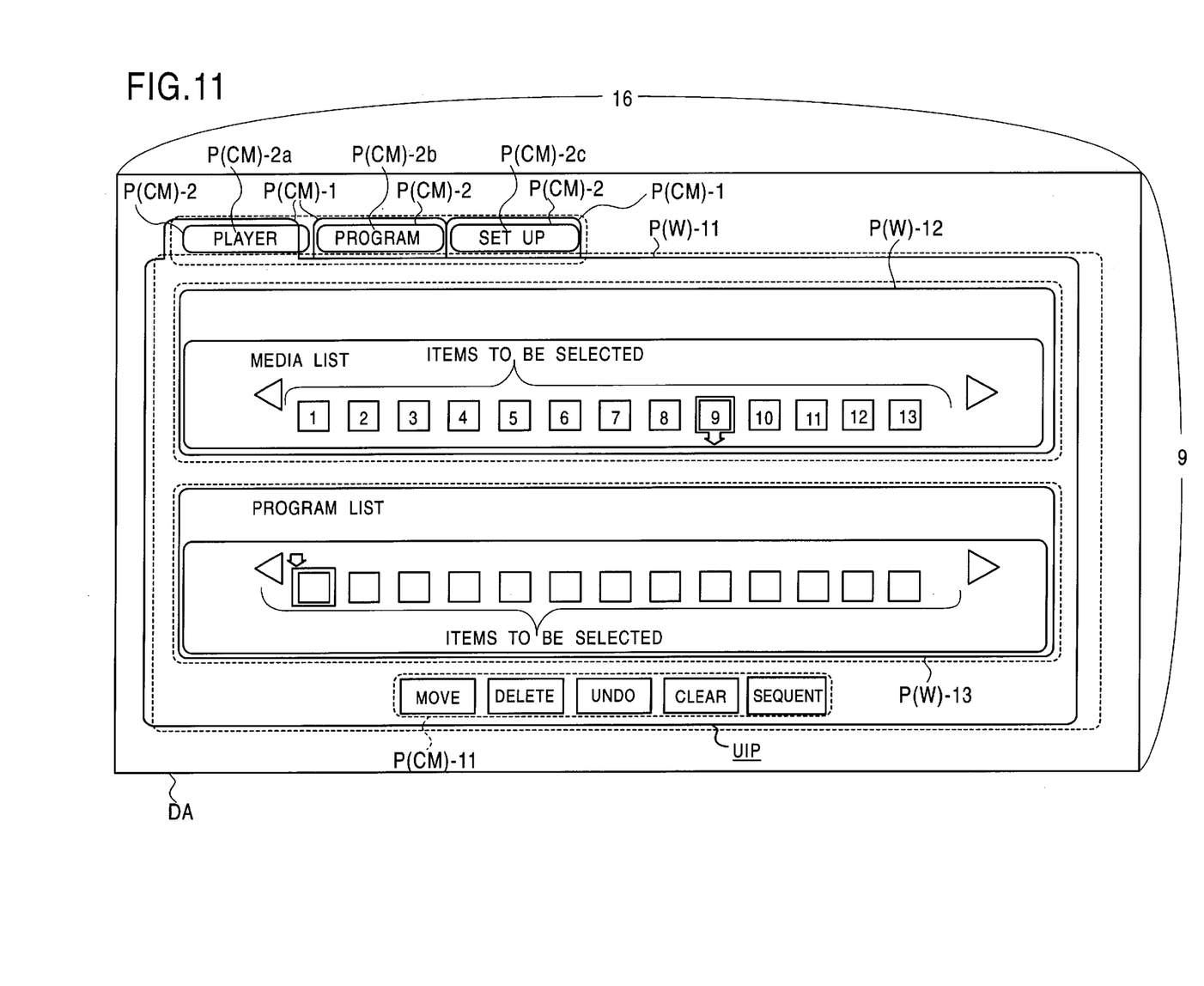
FIG. 11 illustrates an example of the UI picture display in the wide mode.

FIGS. 10 and 11 illustrate another example of the same type of UI picture displayed in the normal mode and in the wide mode, respectively. The UI screen shown in FIGS. 10 and 11 is used for selecting certain items from a "media list" and registering them as items of a "program list", though a detailed explanation is not given. The same parts as those shown in FIGS. 8 and 9 are designated by like reference numerals, and an explanation thereof will thus be omitted. The broken lines shown in FIGS. 10 and 11, as well as those shown in FIGS. 8 and 9, represent separations (boundaries) of parts forming UI pictures.

In the normal-mode UI picture UIP illustrated in FIG. 10, a sheet part P(N)-11 having a bit map size corresponding to the effective display area DA having a 640×480-VGA resolution is mapped. A panel part P(N)-12 indicating the media list and a panel part P(N)-13 indicating the program list are further mapped on the sheet part P(N)-11. The panel parts P(N)-12 and P(N)-13 are normal-mode parts, and the number of items of the media list that can be displayed at one time in the panel parts P(N)-12 and P(N)-13 is set to be, for example, 10, in response to the image size of the normal mode.

Further, on the sheet part P(N)-11, a panel part P(CM)-11 used for operating the program list is mapped below the panel part P(N)-13.

FIG. 11 illustrates the same type of UI picture as that shown in FIG. 10 which is displayed in accordance with the wide mode. The same parts as those shown in FIG. 10 are designated by like reference numerals, and an explanation thereof will thus be omitted.

In the UI picture illustrated in FIG. 11, a sheet part P(W)-11 having a bit map size corresponding to the effective display area DA having a 848×480 resolution (WIDE-1) is mapped. A panel part P(W)-12 indicating the media list, a panel part P(W)-13 indicating the program list, and a panel part P(CM)-11 are mapped on the sheet part P(W)-11. The panel parts P(W)-12 and P(W)-13 are wide-mode parts, and the number of items that can be displayed at one time in the panel parts P(W)-12 and P(W)-13 increases to, for example, 13.

In the foregoing types of UI pictures UIP illustrated in FIGS. 10 and 11, panel parts for the media list and the program list used in the wide mode are different from those used in the normal mode. Thus, when the mode is switched to the wide mode, the number of items that can be displayed at one time is increased while the extended horizontal resolution (number of horizontal pixels) is effectively utilized, thereby enhancing the ease of operation of user interfaces.

In the image portion serving as an operation panel, as well as the counterpart illustrated in FIGS. 8 and 9, a common part, i.e., the panel part P(CM)-11, is shared between the normal mode and the wide mode. Thus, the size of button keys is unchanged in the normal mode and in the wide mode.

In the foregoing UI display technique, a single UI picture may be handled as one part depending on the type of UI picture.

The foregoing UI picture display technique shown in FIGS. 7 through 11 has been explained assuming that the resolutions that can be switched between the normal mode and the wide mode correspond to VGA (640×480) and WIDE-1 (848×480). This technique may be applied when the resolutions that can be switched between the normal mode and the wide mode correspond to SVGA (800×600) and WIDE-2 (1060×600). In this case, the UI picture data is expressed in the form of bit map data having a resolution higher than that for VGA and WIDE-1, which is determined based on the resolutions of SVGA (800×600) and WIDE-2 (1060×600). To produce a higher-resolution UI picture, the image processing should be performed, as has been discussed with reference to FIG. 7.

<5. UI Picture Display Processing>

The foregoing processing operation performed by the controller 12 to display UI pictures will further be explained with reference to the flow chart of FIG. 12.

Upon receiving a predetermined command signal in response to the operation through, for example, the operation unit 19 or the remote controller RC by the user, a processing routine for displaying a UI picture is started with the processing step S101.

In step S102, the controller 12 determines which mode, i.e., the normal mode or the wide mode, has been set. If the normal mode is set, the processing proceeds to step S103. If the wide mode is set, the processing proceeds to step S104.

In step S103, the required normal-mode parts and common parts (and information for specifying the mapping positions) are read from the ROM 13, and image processing is then executed to create the UI picture based on the read data. The processing is then completed.

In step S104, on the other hand, the needed wide-mode parts and common parts (and information for specifying the mapping positions) are read from the ROM 13, and image processing is then executed to create the UI picture based on the read data. The processing is then completed. The image processing in steps S103 and S104 should be performed, as explained with reference to FIG. 7.

Figure 12:
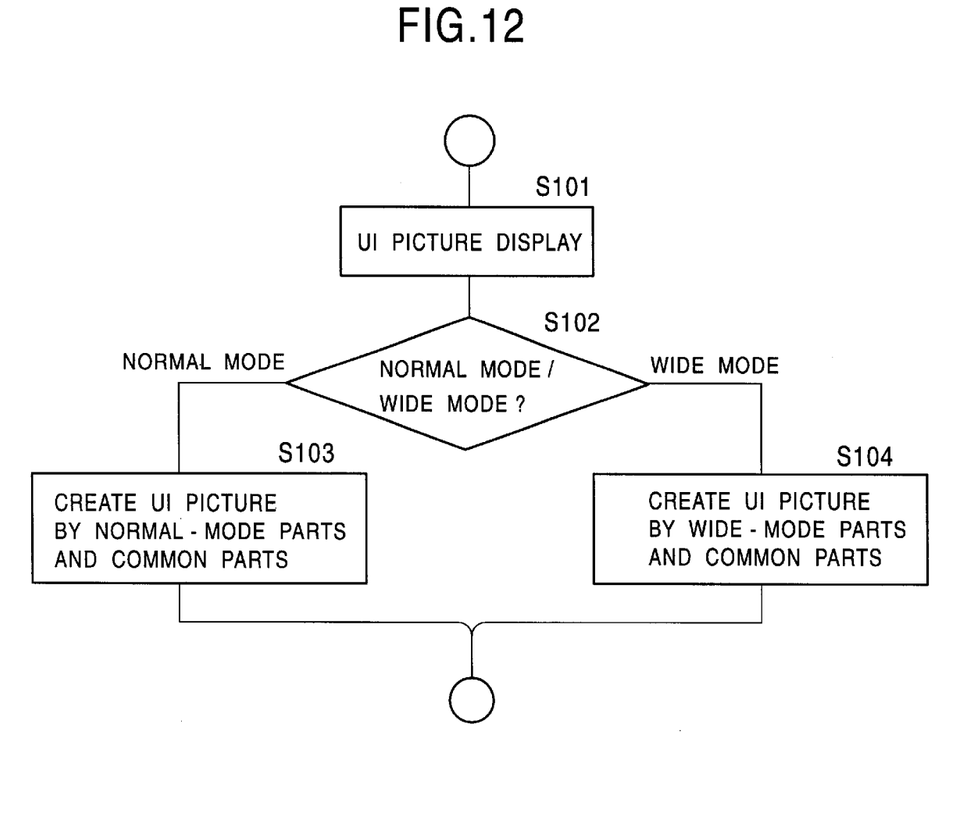
FIG. 12 is a flow chart illustrating the processing for forming UI pictures.

The following modification may further be made to the foregoing configuration, though it is not shown in FIG. 12. The resolution may be changeable between VGA (640×480) and SVGA (800×600) in the normal mode, and the resolution may be changeable between WIDE-1 (848×480) and WIDE-2 (1060×600) in the wide mode. In this case, different items of UI image data having the respective resolutions suitable for VGA and SVGA or WIDE-1 and WIDE-2 may be prepared for the same type of UI picture and be stored in the ROM 13. In response to the foregoing modification, the image processing may be performed in the following manner. It may be judged in step S103 or S104 which resolution has been set in the same normal or wide mode, and the UI picture data created in accordance with the determined resolution may be read from the ROM 13.

In the foregoing embodiment, although the number of horizontal/vertical pixels corresponding to an image having an aspect ratio of 16:9 is set based on VGA as a graphic display standard, another graphic display standard may be used. Moreover, the number of horizontal/vertical pixels compatible with an aspect ratio of 16:9 are not restricted to WIDE-1 (848×480) and WIDE-2 (1060×600), and a higher resolution may be specified to display pictures in the wide mode.

Further, although in the foregoing embodiment the set top box 1 is used as a machine provided with an image processing apparatus of the present invention, other types of machines, such as ordinary personal computers and game machines equipped with a computer system, may be employed.

As is seen from the foregoing description, the present invention offers the following advantages.

In the computer field, such as in set top boxes and personal computers, the resolution (number of vertical/horizontal pixels) in accordance with an aspect ratio of 16:9 is specified, and the resolution between aspect ratios of 4:3 and 16:9 can be switched to suitably display images. It is also possible to display different UI pictures based on the image data which has been created suitable for the determined resolution of an aspect ratio 4:3 or 16:9. With this arrangement, UI pictures produced when the resolution of an aspect ratio 16:9 is set can be displayed without distortion caused by extending the UI pictures in the horizontal direction. The wide display area can thus be effectively utilized while the UI pictures match the increased resolution in accordance with an aspect ratio of 16:9. Additionally, the size of image portions corresponding to, for example, an operation panel provided with keys and buttons, is unchanged between the aspect ratios 4:3 and 16:9. The user thus feels visually comfortable with the resulting pictures, and the appearance of the UI pictures can be enhanced from an aesthetic point of view.

To implement the above-described UI image display technique, a UI picture is divided into the following three parts: normal-mode parts only used for displaying a UI picture when the resolution in accordance with an aspect ratio of 4:3 is set, wide-mode parts only used for displaying a UI picture when the resolution with an aspect ratio of 16:9 is set, and common parts shared between both resolutions. This makes it possible to decrease the amount of data to be stored in a ROM and also to enhance the simplicity of data management, and further to increase the flexibility in changing the specifications of UI pictures.

What is claimed is:

1. An image-processing apparatus comprising:
    resolution setting means for setting as resolutions of an image to be displayed a first resolution in accordance with a first aspect-ratio and a second resolution in accordance with a second aspect-ratio which is different from said first aspect ratio;
    image-data storage means for storing at least first image data for forming an undistorted first type of user interface image for said first resolution and second image data for forming an undistorted second type of user interface image for said second resolution; and
    image-processing means for executing image processing so that said first type of user interface image is formed from said first image data read from said image-data storage means when said first resolution is set to fill said first aspect ratio with meaningful video information and so that said second type of user interface image is formed from said second image data read from said image-data storage means when said second resolution is set to fill said second aspect ratio with meaningful video information.

2. An image-processing apparatus according to claim 1, wherein said first image data and said second image data comprise a first type of image data which is used as parts for forming said first type of user interface image to be displayed when said first resolution is set, a second type of image data which is used as parts for forming said second type of user interface image to be displayed when said second resolution is set, and a third type of image data used as parts for forming a user interface image to be displayed when either of said first resolution or said second resolution is set, and wherein said image-processing means executes image processing so that said first type of user interface image is formed by reading predetermined items of said first image data and said third image data from said image-data storage means when said first resolution is set and by mapping the read data on an image-processing region determined based on said first aspect-ratio, and said image-processing means executes image processing so that said second type of user interface image is formed by reading predetermined items of said second image data and said third image data when said second resolution is set and by mapping the read data on an image-processing region determined based on said second aspect-ratio.

3. An image-processing apparatus according to claim 1, wherein said first aspect-ratio is 4:3, and said second aspect-ratio is 16:9.

4. An image-processing method comprising:
    a resolution-setting step of setting as resolutions of an image to be displayed a first resolution in accordance with a first aspect-ratio and a second resolution in accordance with a second aspect-ratio which is different from said first aspect ratio,
    an image-data storage step of storing in image-data storage means at least first image data for forming an undistorted first type of user interface image for said first resolution and second image data for forming an undistorted second type of user interface image for said second resolution; and
    an image-processing step of executing image processing so that said first type of user interface image is formed from said first image data read from said image-data storage means when said first resolution is set to fill said first aspect ratio with meaningful video information and that said second type of user interface image is formed from said second image data read from said image-data storage means when said second resolution is set to fill said second aspect ratio with meaningful video information.

5. An image-processing method according to claim 4, wherein said first image data and said second image data comprise a first type of image data which is used as parts for forming said first type of user interface image to be displayed when said first resolution is set, a second type of image data which is used as parts for forming said second type of user interface image to be displayed when said second resolution is set, and a third type of image data used as parts for forming a user interface image to be displayed when either of said first resolution or said second resolution is set, and wherein said image-processing step comprises a step of forming said first type of user interface image by reading predetermined items of said first type of image data and said third type of image data from said image-data storage means when said first resolution is set and by mapping the read data in an image-processing region determined based on said first resolution, and a step of forming said second type of user interface image by reading predetermined items of said second type of image data and said third type of image data from said image-data storage means when said second resolution is set and by mapping the read data in an image-processing region determined based on said second resolution.

6. A display system comprising:

an image-processing apparatus including resolution setting means for setting as resolutions of an image to be displayed a first resolution in accordance with a first aspect-ratio and a second resolution in accordance with a second aspect-ratio which is different from said first aspect ratio, image-data storage means for storing at least first image data for forming an undistorted first type of user interface image for said first resolution and second image data for forming an undistorted second type of user interface image for said second resolution, and image-processing means for executing image processing so that said first type of user interface image is formed from said first image data read from said image-data storage means when said first resolution is set to fill said first aspect-ratio with meaningful video information and so that said second type of user interface image is formed from said second image data read from said image-data storage means when said second resolution is set to fill said second aspect-ratio with meaningful video information;

an image-signal output apparatus for outputting the image data obtained by said image-processing apparatus as an image signal; and a monitor having a display screen having a size in accordance with said first aspect-ratio or said second aspect-ratio, said monitor being able to display images respectively suitable for said first resolution and said second resolution set by said image-processing apparatus based on the image signal supplied from said image-signal output apparatus.

7. A display system according to claim 6, wherein said image-signal output apparatus is contained in a computer.

* * * * *